(12) United States Patent
Ivester et al.

(10) Patent No.: US 11,809,315 B2
(45) Date of Patent: Nov. 7, 2023

(54) FABRICLESS ALLOCATION OF CACHE SLOTS OF LOCAL SHARED CACHES WITH CACHE SLOT RECYCLING IN A FABRIC ENVIRONMENT

(71) Applicant: EMC IP HOLDING COMPANY LLC, Hopkinton, MA (US)

(72) Inventors: Steve Ivester, Grafton, MA (US); Kaustubh Sahasrabudhe, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 128 days.

(21) Appl. No.: 17/203,854

(22) Filed: Mar. 17, 2021

(65) Prior Publication Data

US 2022/0300420 A1  Sep. 22, 2022

(51) Int. Cl.
| | |
|---|---|
| G06F 12/06 | (2006.01) |
| G06F 12/084 | (2016.01) |
| G06F 9/50 | (2006.01) |
| G06F 12/0871 | (2016.01) |
| G06F 11/20 | (2006.01) |
| G06F 12/0802 | (2016.01) |

(52) U.S. Cl.
CPC ........ *G06F 12/0646* (2013.01); *G06F 9/5016* (2013.01); *G06F 11/2053* (2013.01); *G06F 12/084* (2013.01); *G06F 12/0871* (2013.01); *G06F 12/0802* (2013.01); *G06F 2212/1024* (2013.01); *G06F 2212/1041* (2013.01); *G06F 2212/282* (2013.01); *G06F 2212/313* (2013.01); *G06F 2212/502* (2013.01)

(58) Field of Classification Search
CPC .................................................. G06F 12/0646
See application file for complete search history.

(56) References Cited

U.S. PATENT DOCUMENTS

| | | | | |
|---|---|---|---|---|
| 2003/0229743 | A1* | 12/2003 | Brown | G06F 13/364 710/113 |
| 2020/0142828 | A1* | 5/2020 | Yao | G06F 12/0868 |
| 2020/0334162 | A1* | 10/2020 | Sahasrabudhe | G06F 12/121 |
| 2021/0132999 | A1* | 5/2021 | Haywood | G06F 9/544 |
| 2021/0326255 | A1* | 10/2021 | Gu | G06F 12/084 |

* cited by examiner

*Primary Examiner* — Rocio Del Mar Perez-Velez
*Assistant Examiner* — Marwan Ayash
(74) *Attorney, Agent, or Firm* — Anderson Gorecki LLP (57) ABSTRACT

Worker threads allocate at least some recycled cache slots of a local portion of a shared memory to the compute node to which the memory portion is local. More specifically, the recycled cache slots are allocated prior to receipt of the IO that the recycled cache slot will be used to service. The allocated recycled cache slots are added to primary queues of each compute node. If a primary queue is full then the worker thread adds the recycled cache slot, unallocated, to a secondary queue. Cache slots in the secondary queue can be claimed by any compute node associated with the shared memory. Cache slots in the primary queue can be used by the local compute node without sending test and set messages via the fabric that interconnects the compute nodes, thereby improving IO latency.

5 Claims, 5 Drawing Sheets

Figure 5

FABRICLESS ALLOCATION OF CACHE SLOTS OF LOCAL SHARED CACHES WITH CACHE SLOT RECYCLING IN A FABRIC ENVIRONMENT

TECHNICAL FIELD

The subject matter of this disclosure is generally related to electronic data storage systems, and more particularly to allocation of shared memory in such systems.

BACKGROUND

Mass data storage systems such as storage area networks (SANs) are used to maintain large storage objects and contemporaneously support multiple host applications. A storage array, which is an example of a SAN, includes a network of interconnected compute nodes that manage access to host application data stored on arrays of non-volatile drives. The compute nodes access the data in response to input-output commands (IOs) from host applications that are typically run by servers known as "hosts." Examples of host applications may include, but are not limited to, software for email, accounting, manufacturing, inventory control, and a wide variety of other business processes.

The IO workload on the storage array is normally distributed among the compute nodes such that individual compute nodes are each able to respond to IOs with no more than a target level of latency. However, unbalanced IO workloads and resource allocations can result in some compute nodes being overloaded while other compute nodes have unused memory and processing resources. It is known to implement a shared memory that enables a compute node with a relatively high IO workload to utilize the volatile memory of another compute node that has a relatively low workload. However, finding and reserving shared memory resources contributes to IO latency.

SUMMARY

In accordance with some implementations an apparatus comprises: a data storage system comprising: a plurality of non-volatile drives; and a plurality of compute nodes that are interconnected by a fabric and that present at least one logical production volume to hosts and manage access to the drives, each of the compute nodes comprising a local memory and being configured to allocate a portion of the local memory to a shared memory that can be accessed by each of the compute nodes, the shared memory comprising cache slots that are used to store data for servicing input-output commands (IOs); a plurality of worker threads, each associated with one of the compute nodes and configured to recycle cache slots of the allocated portion of the local memory of that compute node, wherein the worker threads allocate at least some of the recycled cache slots to the respective associated compute node prior to receipt of an IO for which the recycled cache slot will be utilized.

In accordance with some implementations a method for allocating cache slots of a shared memory in a data storage system comprising a plurality of non-volatile drives and a plurality of compute nodes that are interconnected by a fabric and that present at least one logical production volume to hosts and manage access to the drives, each of the compute nodes comprising a local memory and being configured to allocate a portion of the local memory to the shared memory that can be accessed by each of the compute nodes, the shared memory comprising the cache slots that are used to store data for servicing input-output commands (IOs), comprises: recycling cache slots of the allocated portions of the local memories; and allocating at least some of the recycled cache slots to the respective associated compute node prior to receiving an IO for which the recycled cache slot will be utilized.

In accordance with some implementations a computer-readable storage medium stores instructions that when executed by a compute node cause the compute node to perform a method for allocating cache slots of a shared memory in a data storage system comprising a plurality of non-volatile drives and a plurality of compute nodes that are interconnected by a fabric and that present at least one logical production volume to hosts and manage access to the drives, each of the compute nodes comprising a local memory and being configured to allocate a portion of the local memory to the shared memory that can be accessed by each of the compute nodes, the shared memory comprising cache slots that are used to store data for servicing input-output commands (IOs), the method comprising: recycling cache slots of the allocated portions of the local memories; and allocating at least some of the recycled cache slots to the respective associated compute node prior to receiving an IO for which the recycled cache slot will be utilized.

DETAILED DESCRIPTION

All examples, aspects, and features mentioned in this disclosure can be combined in any technically possible way. The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
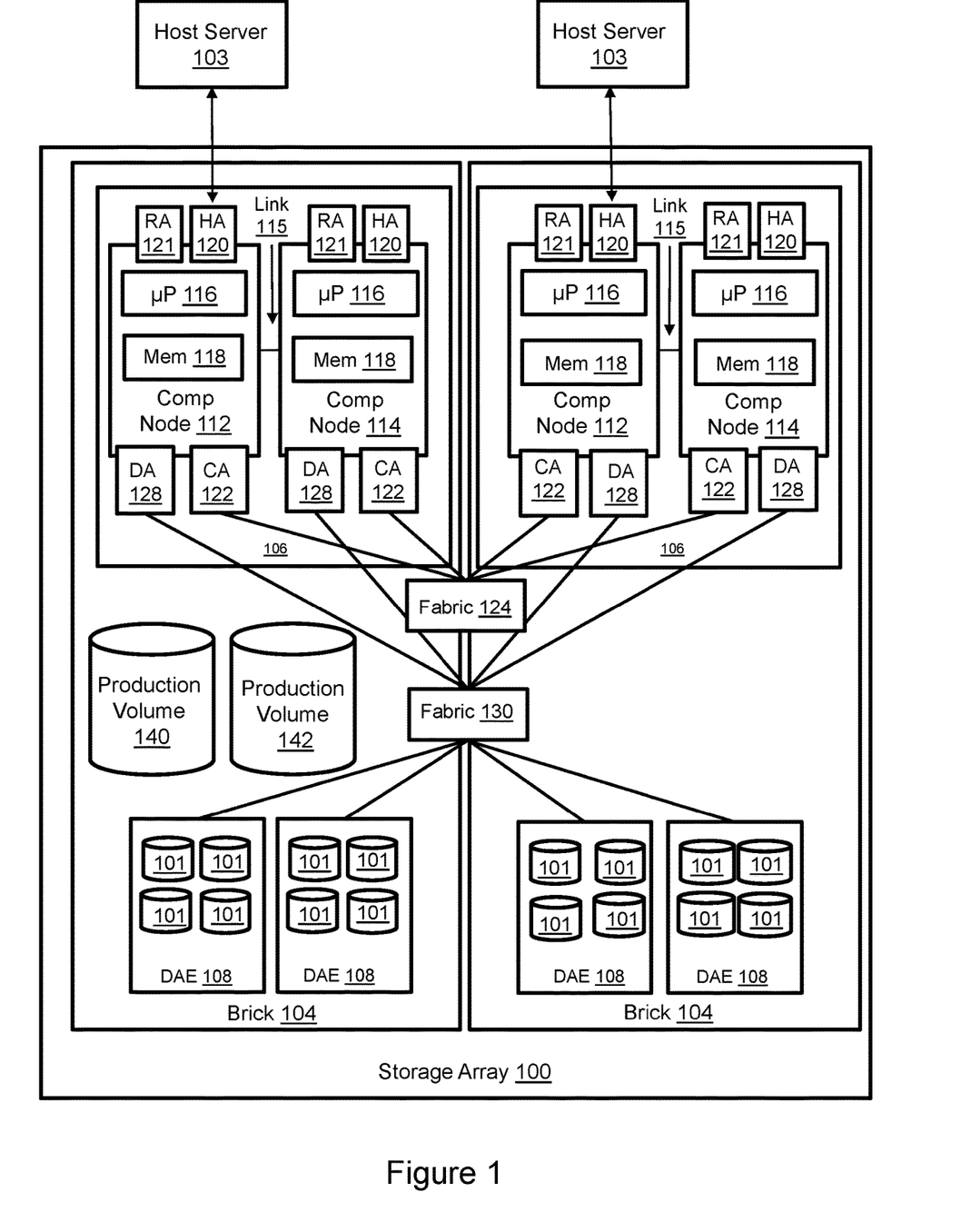
FIG. 1 illustrates a storage array with fabric-less allocation of local cache slots of a shared memory.

FIG. 1 illustrates a storage array 100 with fabric-less allocation of local cache slots of a shared memory. The term "allocation" refers to temporary exclusive ownership of cache slots that excludes non-owners from writing to the cache slot. The storage array is depicted in a simplified data center environment in which two exemplary host servers 103 run instances of host applications that generate IOs such as Reads and Writes that are sent to the storage array. The host servers 103 may be implemented as individual physical computing devices, virtual machines running on the same hardware platform under control of a hypervisor, or in containers on the same hardware platform. As will be explained in greater detail below, worker threads pre-allocate some recycled cache slots to the director to which the cache slots are local, so post-IO cache slot allocation does not require use of the fabric.

The storage array 100 includes multiple bricks 104. Each brick includes an engine 106 and one or more drive array enclosures (DAEs) 108. Each engine 106 includes a pair of compute nodes 112, 114. The compute nodes may be referred to as "storage directors" or simply "directors." Although it is known in the art to refer to the compute nodes of a SAN as "hosts," that naming convention is avoided in this disclosure to help distinguish the network server hosts 103 from the storage array compute nodes 112, 114. Nevertheless, the host applications could run on the compute nodes, e.g., on virtual machines or in containers. The paired compute nodes 112, 114 of each engine are interconnected via point-to-point Peripheral Component Interconnect Express (PCIe) links 115. The paired compute nodes are also configured in a failover relationship, e.g., with compute node 114 replacing compute node 112 in the event of failure. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing IOs from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124, e.g., and without limitation, an InfiniBand fabric. The managed drives 101 are non-volatile electronic data storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained persistently on the managed drives 101. The managed drives 101 are not discoverable by the hosts 103 but the storage array creates logical storage devices such as production volumes 140, 142 that can be discovered and accessed by the hosts, e.g., one production volume per host application. Without limitation, a production volume may alternatively be referred to as a storage object, source device, production device, or production LUN, where the logical unit number (LUN) is a number used to identify logical storage volumes in accordance with the small computer system interface (SCSI) protocol. From the perspective of the hosts 103, each production volume 140, 142 is a single drive having a set of contiguous fixed-size logical block addresses (LBAs) on which data used by the instances of the host application resides. However, the host application data is stored at non-contiguous addresses on various managed drives 101, e.g., at ranges of addresses distributed on multiple drives or multiple ranges of addresses on one drive. As will be explained below, the compute nodes maintain metadata that maps between the production volumes 140, 142 and the managed drives 101 in order to process IOs from the hosts.

Figure 2:
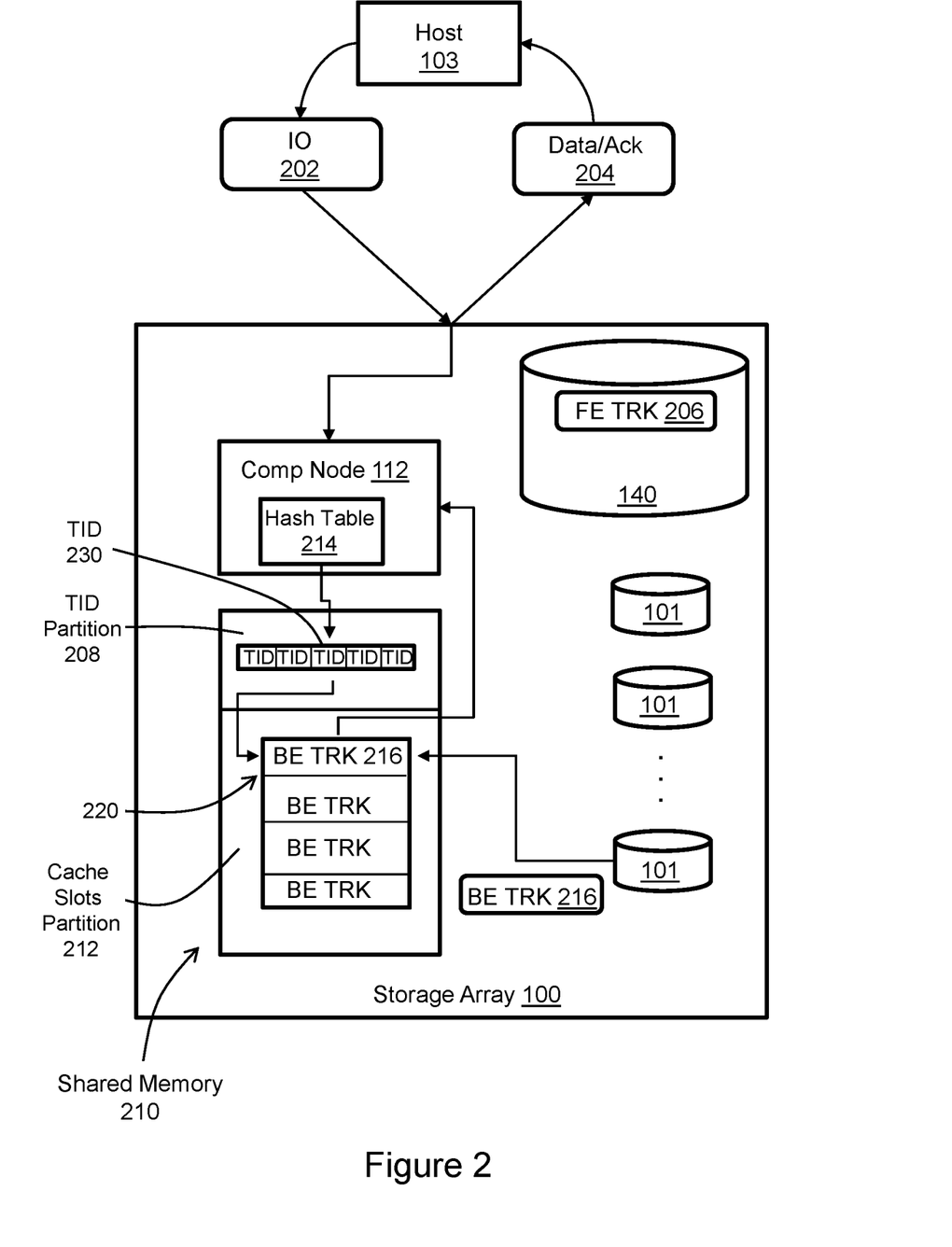
FIG. 2 illustrates how shared memory is used to service IOs.

FIG. 2 illustrates how shared memory is used by one of the compute nodes 112 to service an IO 202 from a host 103. The IO 202 could be a Read command or a Write command. A response 204 to the IO is an Ack in the case of a Write command and data in the case of a Read command. Each compute node in the storage array dedicates a portion of its local memory 118 (FIG. 1) for use as part of a shared memory 210. The shared memory 210 can be accessed by any compute node in the storage array using direct memory access (DMA) or remote direct memory access (RDMA). The shared memory 210 includes a track ID table (TID) partition 208 and a cache slots partition 212. The cache slots partition 212 is used to temporarily stored data for servicing IOs. The production volume 140 is organized into same-fixed-size allocation units of storage capacity known as front-end tracks (FE TRKs) which correspond to same-fixed-size back-end tracks (BE TRKs) on the managed drives. The TIDs that are maintained in partition 208 include metadata such as pointers to specific cache slots that contain specific back-end tracks (BE TRKs) of cached host application data. In the case in which IO 202 is a Read to a FE TRK 206 that is logically stored on production volume 140, the compute node 112 identifies a TID 230 corresponding to FE TRK 206 by inputting information such as the device number, cylinder number, head (track) and size obtained from the IO 202 into a hash table 214. The hash table 214 indicates the location of the TID 230 in partition 208. The TID is obtained and used by the compute node 112 to find the corresponding cache slot that contains the BE TRK 216 associated with FE TRK 206. However, the BE TRK 216 is not necessarily present in the cache slots 212 when the IO 202 is received. The managed drives 101 have much greater storage capacity than the cache slots and IOs are serviced continuously so cache slots are recycled and most of the data maintained by the storage array is not in the cache slots at any point in time. If the BE TRK 216 is not present in the cache slots 212, then the compute node 200 obtains an empty cache slot 220 and then copies the BE TRK 216 from the managed drives 101 into the empty cache slot 220. The empty cache slot 220 could be local or remote relative to the compute node 112. The FE TRK data specified by the IO 202 is copied from the BE TRK 216 in the cache slot and sent to the host 103 in response 204. In the case of a Write IO 202, the empty cache slot 220 is obtained and the FE TRK data of the IO is copied into the BE TRK 216 in the cache slot 220 and eventually destaged to the managed drives 101, e.g., overwriting the stale copy of the BE TRK on the managed drives. The condition in which a BE TRK designated by an IO is already present in the cache slots when the IO is received is referred to as a "cache hit." The condition in which the BE TRK designated by an IO is not in the cache slots when the IO is received is referred to as a "cache miss."

IO latency can be measured as the elapsed time between receipt of the IO 202 by the storage array 100 and the transmission of the corresponding response (data or Ack) 204 by the storage array. IO latency is a way in which storage array performance is measured so it is desirable for the storage array to exhibit low IO latency. A variety of factors can contribute to IO latency. A cache hit will typically result in lower IO latency than a cache miss because of the time required to copy data from the managed drives to the cache slots. Another potential contributor to IO latency is communication between compute nodes to obtain empty cache slots, particularly communication via the fabric.

Figure 3:
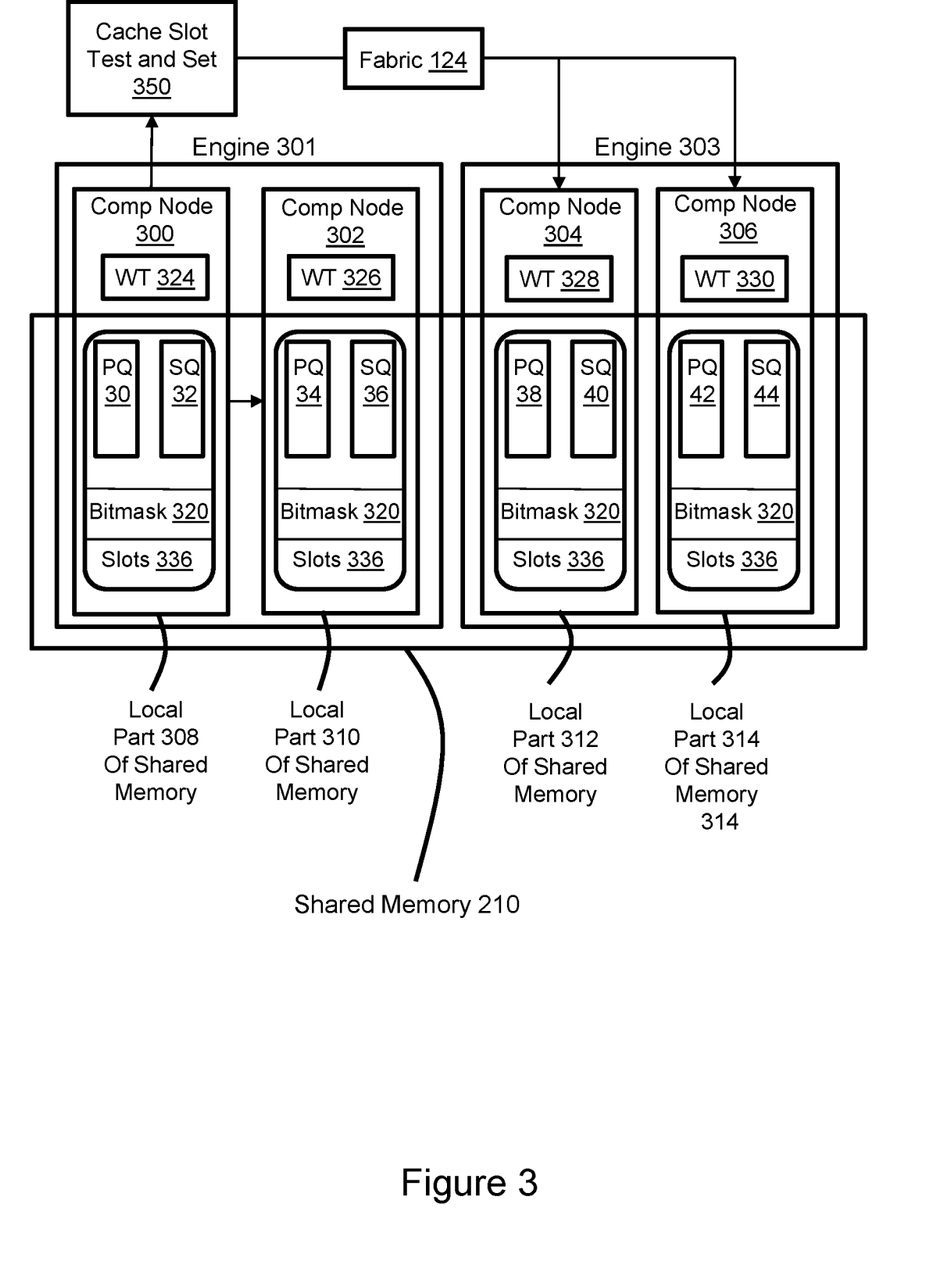
FIG. 3 illustrates recycling with pre-allocation of local cache slots by worker threads.

FIG. 3 illustrates recycling with pre-allocation of local cache slots by worker threads running on a storage array. A first engine 301 includes paired compute nodes 300, 302. A second engine 303 includes paired compute nodes 304, 306. Each compute node runs its own worker thread. Compute node 300 runs worker thread 324, compute node 302 runs worker thread 326, compute node 304 runs worker thread 328, and compute node 306 runs worker thread 330. Worker threads function to recycle cache slots 336 by converting allocated, used cache slots into free (unused) cache slots that can be used to service IOs. Cache slot recycling normally requires at least two blocking operations to be performed by a worker thread: searching for a candidate cache slot to be flushed or destaged; and unbinding or disassociating a selected candidate cache slot from its current TID. Consequently, recycling a cache slot may include destaging dirty data to the managed drives and flushing non-dirty data from the cache slot. Cache slot selection for recycling can be based on a variety of algorithms and may, for example and without limitation, be based primarily on the least recently used cache slot. Recycling is a background activity that is implemented as processor cycles are available, whereas IO processing is a foreground activity. The operational domain of each worker thread may be the local part of the shared memory on the compute node on which the worker thread runs. For example, worker thread 324 might only recycle cache slots 336 in local part 308 of shared memory, worker thread 326 might only recycle cache slots 336 in local part 310 of shared memory, worker thread 328 might only recycle cache slots 336 in local part 312 of shared memory, and worker thread 330 might only recycle cache slots 336 in local part 314 of shared memory. Depending on IO workload and spare CPU cycles, the recycle rate and number of free cache slots may vary over time.

Ownership of cache slots is indicated by a bitmask 320. Ownership of an individual cache slot can be indicated by setting a bit in the bitmask corresponding to that cache slot. The bitmask is updated by sending a cache slot test and set message 350 via the fabric 124. When a cache slot is claimed by a compute node, i.e., owned by or allocated to the compute node, none of the other compute nodes can write to that cache slot. When a cache slot is recycled the bitmask may be updated by a worker thread.

Some previously known implementations of storage array compute nodes searched for and claimed cache slots to service an IO only after the IO was received. For example, compute node 300 could receive an IO and subsequently look for a free cache slot in its local part 308 of the shared memory. If a free cache slot were found in in its local part 308 of the shared memory then the compute node 300 would signal to all other computer nodes 302, 304, 306 via the fabric 124 to claim the cache slot by updating the bitmask. Once the cache slot was successfully claimed then the cache slot could be used to service the IO. However, signaling via the fabric 124 after receipt of the IO contributes to IO latency and fabric contention. The worker threads in the illustrated example help to reduce IO latency and fabric contention by pre-allocating selected recycled cache slots to the compute node to which the cache slots are local. Pre-allocation with a local bias helps to reduce IO latency.

Each worker thread has an associated primary FIFO queue and a secondary FIFO queue. Primary queue 30 and secondary queue 32 include the cache slots of local part 308 that have been recycled by worker thread 324 but remain unused. Primary queue 34 and secondary queue 36 include the cache slots of local part 310 that have been recycled by worker thread 326 but remain unused. Primary queue 38 and secondary queue 40 include the cache slots of local part 312 that have been recycled by worker thread 328 but remain unused. Primary queue 42 and secondary queue 44 include the cache slots of local part 314 that have been recycled by worker thread 330 but remain unused. Recycled, unused cache slots are added to either the primary queue or the secondary queue. Cache slots entered into the primary queue are pre-allocated to the local compute node. Cache slots entered into the secondary queue are not pre-allocated to any compute node and are thus available to be claimed by any of the compute nodes of the storage array. Each primary queue has a finite predetermined fixed depth. The worker thread associated with a primary queue adds recycled cache slots to the primary queue unless the primary queue is full. If the primary queue is full then the worker thread adds recycled cache slots to the secondary queue. For example, when worker thread 324 recycles a cache slot from local part 308 of the shared memory, the recycled cache slot is placed in primary queue 30 unless primary queue 30 is full, in which case the recycled cache slot is placed in secondary queue 32. If the primary queue 30 is not full then the worker thread 324 prompts a cache slot test and set message 350 to be sent via fabric 124 to update the bitmask 320 to indicate that the recycled cache slot is allocated to compute node 300. This pre-allocation of the recycled cache slot does not increase IO latency because it is completed before receipt of the next IO that will use the recycled cache slot. When compute node 300 receives an IO, the next cache slot in the primary FIFO queue 30 is used to service that IO. Metadata is sent from the compute node 300 to its paired compute node 302 via the PCIe link to indicate that the cache slot is being placed into use, but communication via the fabric 124 to update bitmasks is unnecessary because ownership of the cache slot by compute node 300 has already been established by the worker thread 324. In the case in which there are no free cache slots in the local part 308 of the shared memory, the compute node 300 uses cache slots that are local to a different compute node of the storage array. In order to claim such cache slots, it is necessary to send a cache slot test and set message 350 via the fabric 124 after receipt of the IO to locate a cache slot in a secondary queue of a different compute node and establish ownership of that cache slot by updating the bitmask.

Figure 4:
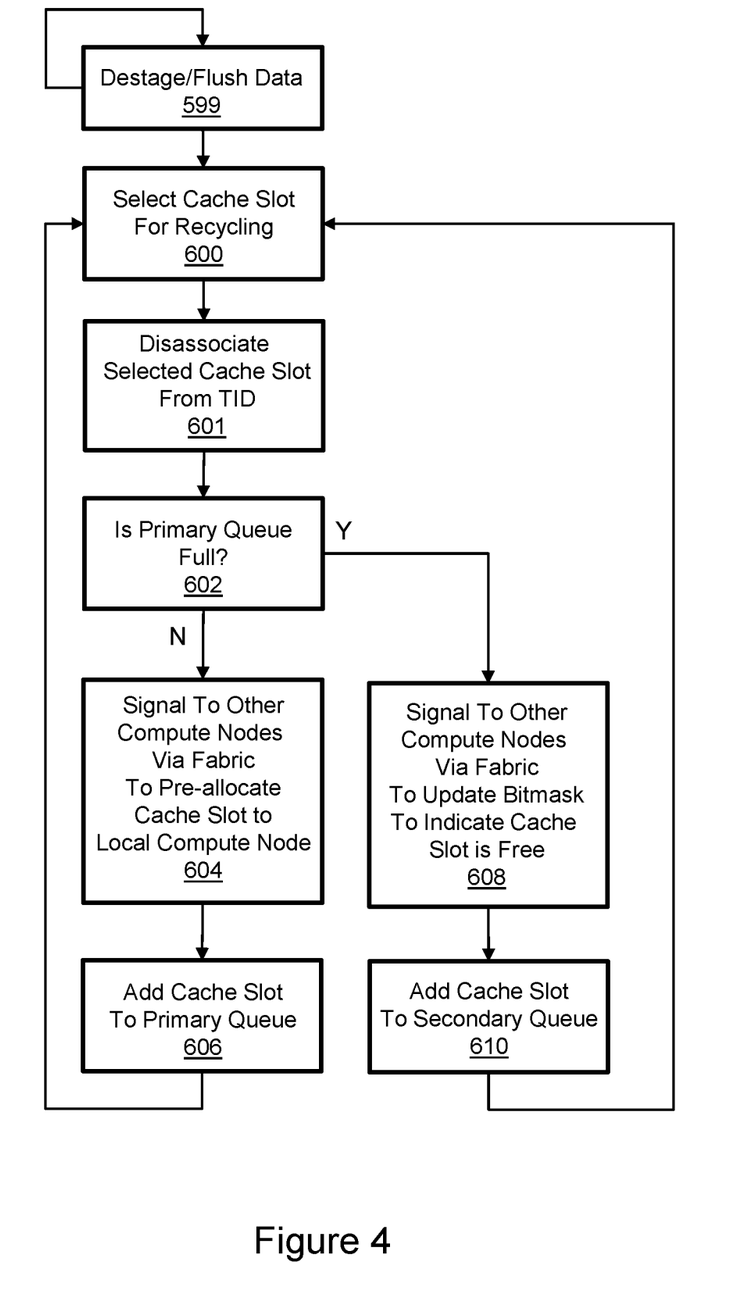
FIG. 4 illustrates steps associated with recycling with pre-allocation of local cache slots by worker threads.

FIG. 4 illustrates steps associated with recycling with pre-allocation of local cache slots by worker threads. Data is destaged or flushed from cache slots on an ongoing basis by all compute nodes as indicated in step 599. Dirty data is destaged to the managed drives whereas non-dirty data can simply be flushed from the cache slot. Destaging and flushing may be performed in the background as resources allow, including both locally used cache slots and non-locally used cache slots that are released by other compute nodes. A destaged/flushed cache slot is selected for recycling as indicated in step 600. The least recently used cache slot in the local part of the shared memory could be selected. The next step 601 is to unbind or disassociate the selected cache slot from the TID. If the primary queue is not full as determined in step 602 then the worker thread signals to other compute nodes via the fabric to pre-allocate the cache slot to the local compute node as indicated in step 604. The cache slot is then added to the primary queue as indicated in step 606 and another cache slot is selected in step 600. If the primary queue is full as determined in step 602 then the worker thread signals to other compute nodes via the fabric to update the bitmask to indicate that the selected cache slot is free as indicated in step 608. The cache slot is then added to the secondary queue as indicated in step 610 and another cache slot is selected in step 600.

Figure 5:
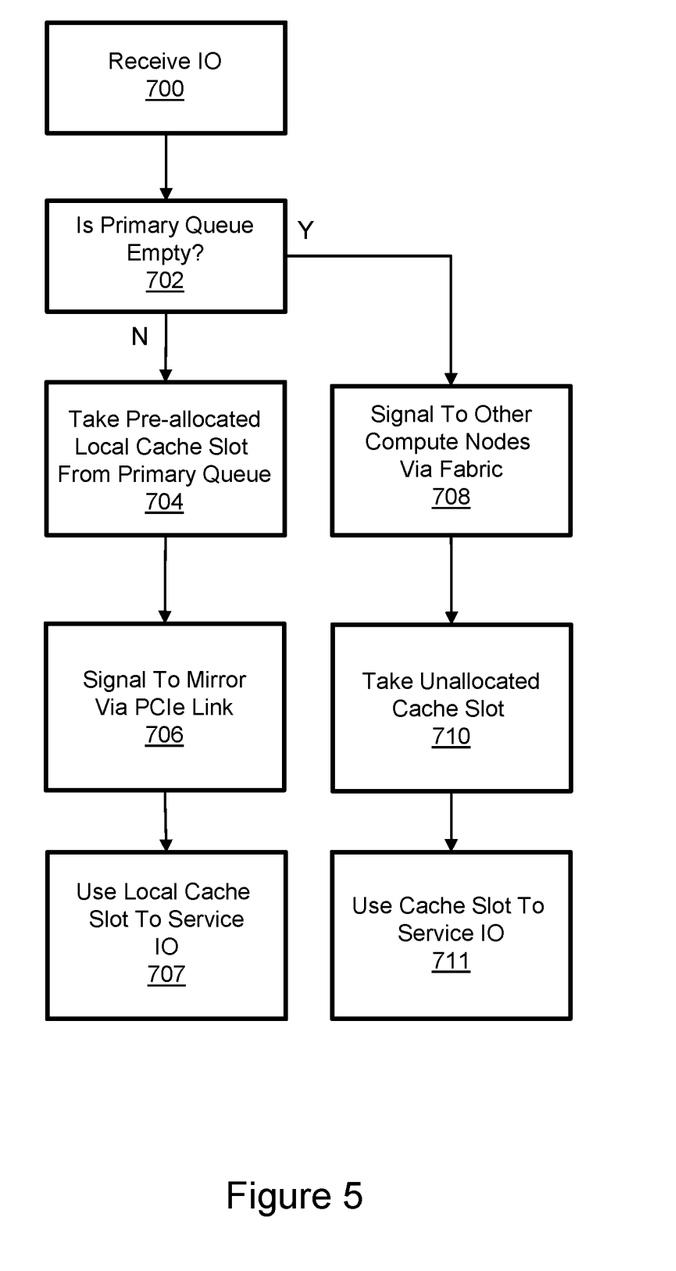
FIG. 5 illustrates steps associated with fabric-less allocation of local cache slots of a shared memory.

FIG. 5 illustrates steps associated with fabric-less allocation of local cache slots of a shared memory. Following receipt of an IO in step 700 the compute node determines whether the primary queue is empty as indicated in step 702. If the primary queue is not empty, then the compute node generates a cache slot request to take a pre-allocated local cache slot from the primary queue as indicated in step 704. The compute node then signals to the paired compute node of the engine via the PCIe link as indicated in step 706. The local cache slot is then used to service the IO as indicated in step 707. If the primary queue is empty as determined at step 702, then the compute node signals to other compute nodes via the fabric as indicated in step 708 to take an unallocated cache slot as indicated in step 710. A local cache slot is taken if possible. The cache slot is then used to service the IO as indicated in step 711. It is assumed that the local secondary queue will be empty if the local primary queue is empty. However, the local secondary queue could be checked, and cache slots could be taken from the local secondary queue or moved from the local secondary queue to the local primary queue based on availability of cache slots in the local primary queue.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a data storage system comprising:
   a plurality of non-volatile drives;
   a plurality of compute nodes that are interconnected by a fabric and that present at least one logical production volume to hosts and manage access to the drives, each of the compute nodes comprising a local memory and being configured to allocate a portion of the local memory to a shared memory that can be accessed by each of the compute nodes, the shared memory comprising cache slots that are used to store data for servicing input-output commands (IOs);
   a plurality of primary queues, each associated with one of the compute nodes;
   a plurality of secondary queues, each associated with one of the compute nodes;
   a plurality of worker threads, each associated with one of the compute nodes and configured to:
      recycle cache slots of the allocated portion of the local memory of that compute node;
      allocate at least some of the recycled cache slots to the respective associated compute node prior to receipt of an IO for which the recycled cache slot will be utilized by providing temporary exclusive ownership of the allocated recycled cache slots that excludes non-owner compute nodes from writing to the allocated recycled cache slots;
      add the allocated recycled cache slots to one of the primary queues;
      send messages via the fabric to indicate allocation of the allocated recycled cache slots, the compute nodes configured to use the allocated recycled cache slots without sending messages via the fabric to claim ownership of the allocated recycled cache slots;
      recycle at least some of the cache slots without allocation to any of the compute nodes such that unallocated recycled cache slots are available for use by any of the compute nodes by claiming at least one of the unallocated recycled cache slots to service an TO following receipt of the IO; and
      add unallocated recycled cache slots to one of the secondary queues, the unallocated recycled cache slots being created by one of the worker threads only in response to the primary queue associated with the worker thread being full.

2. The apparatus of claim 1 comprising a bitmask that indicates cache slot allocations.

3. A method for allocating cache slots of a shared memory in a data storage system comprising a plurality of non-volatile drives and a plurality of compute nodes that are interconnected by a fabric and that present at least one logical production volume to hosts and manage access to the drives, each of the compute nodes comprising a local memory and being configured to allocate a portion of the local memory to the shared memory that can be accessed by each of the compute nodes, the shared memory comprising the cache slots that are used to store data for servicing input-output commands (IOs), each compute node being uniquely associated with a primary queue and each compute node being uniquely associated with a secondary queue, the method comprising:

recycling cache slots of the allocated portions of the local memories;

allocating at least some of the recycled cache slots to the respective associated compute node prior to receiving an IO for which the recycled cache slot will be utilized by providing temporary exclusive ownership of the allocated recycled cache slots that excludes non-owner compute nodes from writing to the allocated recycled cache slots; and     adding to the allocated recycled cache slots to the primary queues;

sending messages via the fabric to indicate allocation of the allocated recycled cache slots;

the compute nodes using the allocated recycled cache slots without sending messages via the fabric to claim ownership of the allocated recycled cache slots;

recycling at least some of the cache slots without allocation to any of the compute nodes such that unallocated recycled cache slots are available for use by any of the compute nodes by claiming at least one of the unallocated recycled cache slots to service an TO following receipt of the TO, the unallocated recycled cache slots being created only in response to the primary queue associated with the compute node being full; and     adding unallocated recycled cache slots to the secondary queues.

4. The method of claim 3 comprising setting bits of a bitmask to indicate cache slot allocations.

5. A non-transitory computer-readable storage medium storing instructions that when executed by a compute node cause the compute node to perform a method for allocating cache slots of a shared memory in a data storage system comprising a plurality of non-volatile drives and a plurality of compute nodes that are interconnected by a fabric and that present at least one logical production volume to hosts and manage access to the drives, each of the compute nodes comprising a local memory and being configured to allocate a portion of the local memory to the shared memory that can be accessed by each of the compute nodes, the shared memory comprising cache slots that are used to store data for servicing input-output commands (IOs), each compute node being uniquely associated with a primary queue and each compute node being uniquely associated with a secondary queue, the method comprising:

recycling cache slots of the allocated portions of the local memories;

allocating at least some of the recycled cache slots to the respective associated compute node prior to receiving an TO for which the recycled cache slot will be utilized by providing temporary exclusive ownership of the allocated recycled cache slots that excludes non-owner compute nodes from writing to the allocated recycled cache slots; and     adding to the allocated recycled cache slots to the primary queues;

sending messages via the fabric to indicate allocation of the allocated recycled cache slots;

the compute nodes using the allocated recycled cache slots without sending messages via the fabric to claim ownership of the allocated recycled cache slots;

recycling at least some of the cache slots without allocation to any of the compute nodes such that unallocated recycled cache slots are available for use by any of the compute nodes by claiming at least one of the unallocated recycled cache slots to service an TO following receipt of the TO, the unallocated recycled cache slots being created only in response to the primary queue associated with the compute node being full; and     adding unallocated recycled cache slots to the secondary queues.

\* \* \* \* \*